March 2, 1965      F. B. LOGAN      3,171,498

AERATING APPARATUS

Original Filed June 7, 1961      3 Sheets-Sheet 1

INVENTOR.
Frederick B. Logan
BY *Webb, Mackey & Burden*
HIS ATTORNEYS

March 2, 1965

F. B. LOGAN 3,171,498

AERATING APPARATUS

Original Filed June 7, 1961

INVENTOR.
Frederick B. Logan
BY Webb, Mackey + Burden

HIS ATTORNEYS

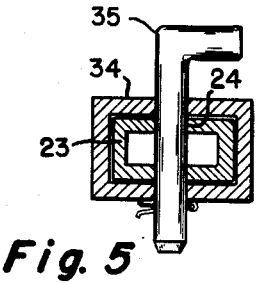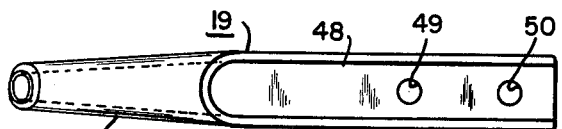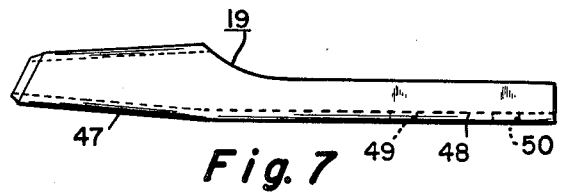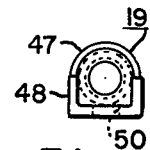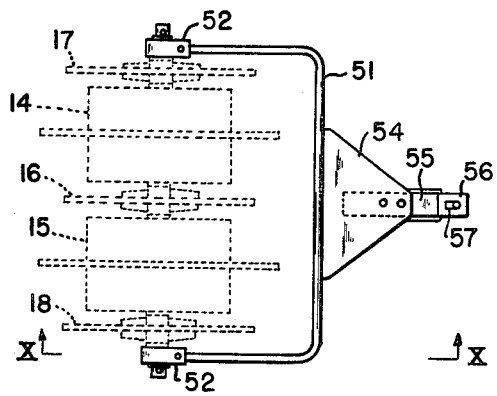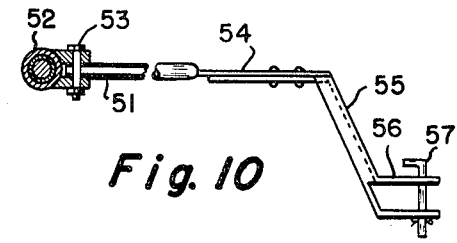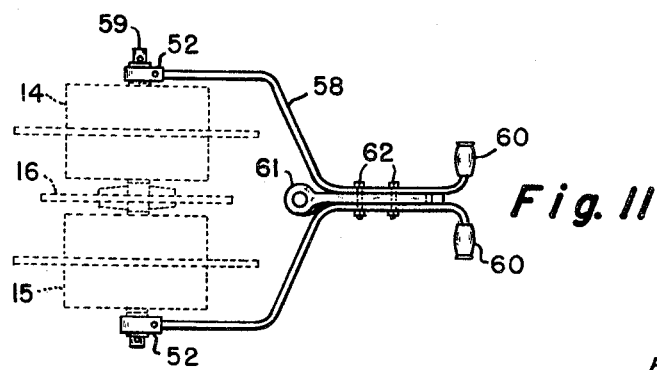

United States Patent Office 3,171,498
Patented Mar. 2, 1965

3,171,498
AERATING APPARATUS
Frederick B. Logan, 10 Columbia Ave., Greenville, Pa.
Continuation of application Ser. No. 115,511, June 7,
1961. This application Dec. 27, 1963, Ser. No. 337,698
4 Claims. (Cl. 172—22)

This application is a continuation of my application Serial No. 115,511, filed June 7, 1961 relating to Aerating Apparatus.

In the maintenance and upkeep of grass surfaces, the principle of aerification of the turf has been known for many years. Air and water, together with fertilizer and top dressing are permitted to penetrate the turf after aerification with resultant improvement in the depth of the root structure of the grasses and producing an end result of a luxurious surface grass mat. The type of aerification of the present application, wherein a plug or cylinder of turf is cut and removed from the turf, is contrasted with aerification by spiking in which spikes are forced into the turf and actually compact the soil around the hole in the turf, thereby impeding moisture penetration into the turf. With the present invention, the plugs of turf are deposited and allowed to remain on the surface of the turf and gradually disintegrate, thereby providing a top dressing for the grass and a constant plowing or turnover of the topsoil. This turnover of the topsoil aids in breaking up organic thatch or mat which is formed by decayed lawn clipping, leaf mulch and the like, and also distributes localized area of high fertilizer concentration. Another major benefit of the presence of the turf plug is that rainfall runoff, carrying with it dissolved fertilizers and top dressings, is greatly reduced and the higher elevations of the lawn are permitted to retain moisture and plant food.

In a home lawn program, aerification should be accomplished several times a year during the spring season to make soil more porous and receptive to water and fertilizer. Aerification in late fall is desirable after the ground has been softened by dampness. The aerification in the fall will permit freezing and thawing action to loosen the entire surface of the lawn area.

My invention is particularly adapted for use on large areas of lawn such as golf courses, playgrounds, and home lawns. My invention is so constructed that sufficient weight in the apparatus is provided by use of water tanks to permit substantial penetration of the aerating elements into the turf to remove the turf plugs. Many of the presently known aerating devices do not provide sufficient weight to penetrate the turf. Other known aerating devices are constructed of heavy steel to supply sufficient weight for proper penetration of the turf and thus are extremely expensive in initial cost.

Preferably, the aerating device should be variable in weight to accomplish penetration of the turf under varying conditions of moisture content in the soil, etc. My invention provides for this factor in that water tanks on my aerator can be filled with varying quantities of liquid to provide an aerator weight which is conducive to proper turf penetration.

My invention is primarily designed for towing behind a small lawn tractor or mower and operates efficiently at any towed speed. Each row of aerator elements is separately rotatable relative to the other rows to permit short radius turns so that the aerator will follow the tractor in its shortest turning radius.

My invention is also designed for operation manually for the aerification of smaller lawns.

My invention operates equally well in forward or reverse directions and thus does not require frequent turning of the aerator.

In the drawings, I have shown a present preferred embodiment of my invention in which:

FIGURE 5 is a cross-section taken on line V—V of FIGURE 2;

FIGURE 6 is a plan view of an aerator tube;

FIGURE 7 is a side elevation view of an aerator tube;

FIGURE 8 is an upper end elevation view of an aerator tube;

FIGURE 9 is a plan view of a modified draw bar for use with the aerator, and is principally designed for operation behind power lawn mowers or tractors;

FIGURE 10 is a cross-section taken on line X—X of FIGURE 9; and

FIGURE 11 is a plan view of a second modified draw bar for use with my invention, and particularly designed for use as a manually operated aerator.

Figure 1:
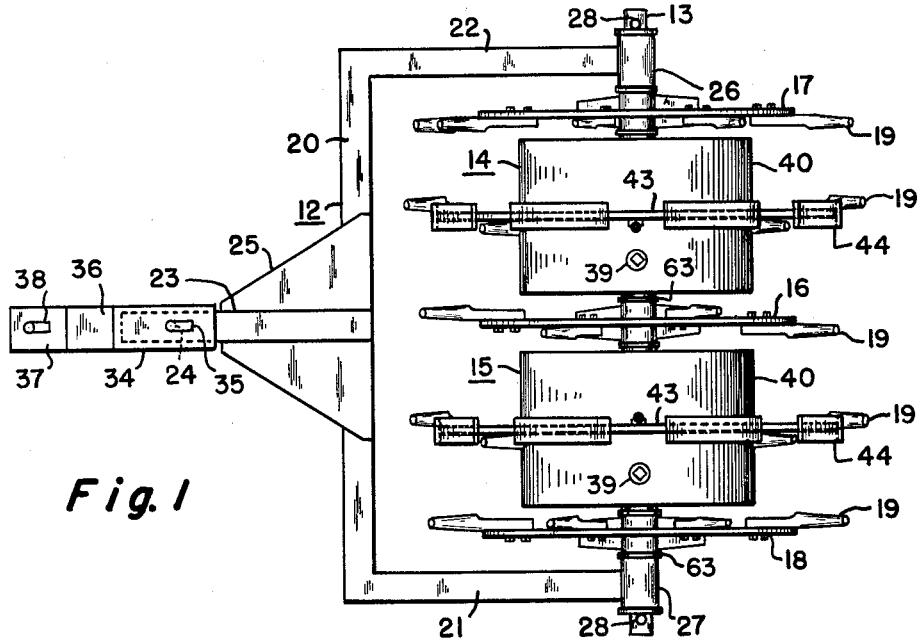
FIGURE 1 is a plan view of my aerator adapted for towing behind a tractor, with parts removed for clarity.
Figure 4:
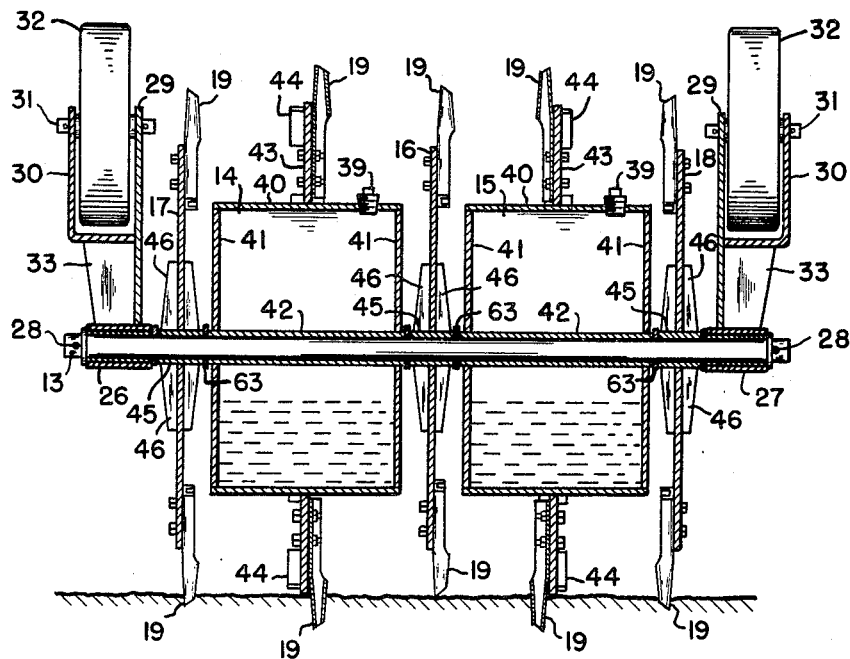
FIGURE 4 is a cross-section taken on line IV—IV of FIGURE 2.

Briefly, my invention is directed to an aerator having a draw bar 12 rotatably mounting a transverse axle 13 on which a pair of tanks 14 and 15 and center and end disk aerator tube holders 16, 17 and 18 are rotatably mounted. A plurality of aerator tubes 19 are fixed radially to the disks 16, 17 and 18 and the drums 14 and 15. These aerator tubes perforate the turf and remove a turf plug in a manner to be described hereinafter. As shown in FIGURES 1 and 4, each of the tanks 14 and 15 has a single row of the tubes 19.

Referring specifically to the drawings, the draw bar 12 includes a transverse, rigid angle 20 having spaced angles 21 and 22 welded perpendicular thereto. These angles form a C-shaped horizontal frame of the draw bar. A box beam 23 is affixed to the midpoint of angle 12 and extends forward of and in the same plane as the draw bar frame. The outer end of the box beam 23 has an opening 24. The box beam 23 is rigidly supported on the angle 20 by a gusset plate 25 welded to the beam and angle. Affixed to the free ends of the angles 21 and 22 are draw bar couplings 26 and 27, which contain bushings rotatably supporting the continuous steel axle 13. Preferably, this axle is a 1" or 1¼" diameter cold rolled steel shaft. The axle 13 is rotatably mounted in the bushings 26 and 27, and held in place by cotter pins 28 removably positioned in an opening at each end of each axle.

A transport wheel is affixed to the draw bar at each bushing 26 and 27. The transport wheel includes a wheel housing having a vertical plate 29 with an L-shaped plate 30 welded thereto forming an opening across which an axle 31 is mounted. A wheel 32 is rotatably mounted on axle 31. A gusset plate 33 is welded between the upper side of L-shaped plate 30 and the bushings 26 and 27 to provide rigidity in the wheel housing.

Figure 2:
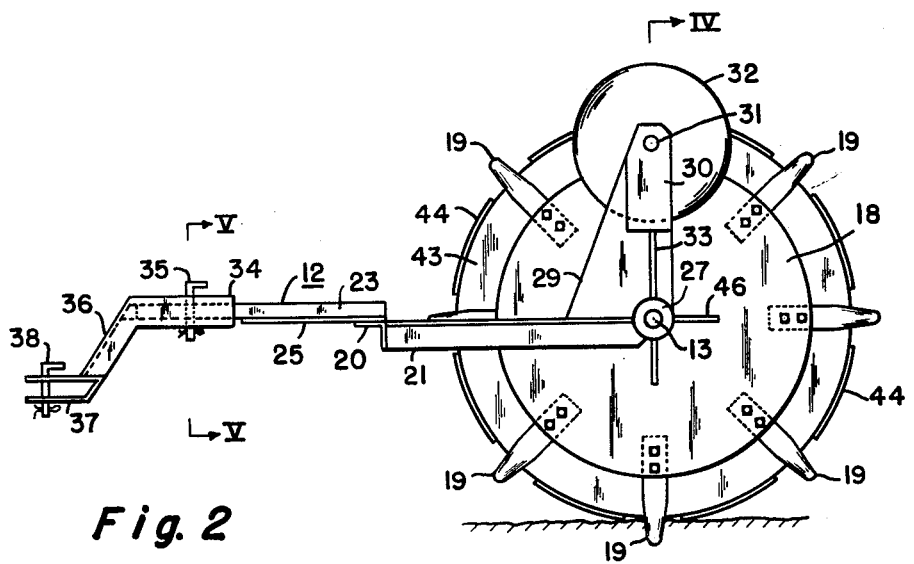
FIGURE 2 is a side elevation view of my aerator of FIGURE 1 with transport wheels in an up position.

As shown in FIGURE 2, the transport wheels are in a vertical position above the bushings during utilization of the aerator in perforating the turf. When it is desired to transport the aerator over paved areas or for long distances, the draw bar 12 is disconnected from the tractor and is swung over the top of the aerator, thereby bringing the transport wheels into engagement with the underlying surface and elevating the aerator above the surface in the manner shown in FIGURE 3.

Figure 3:
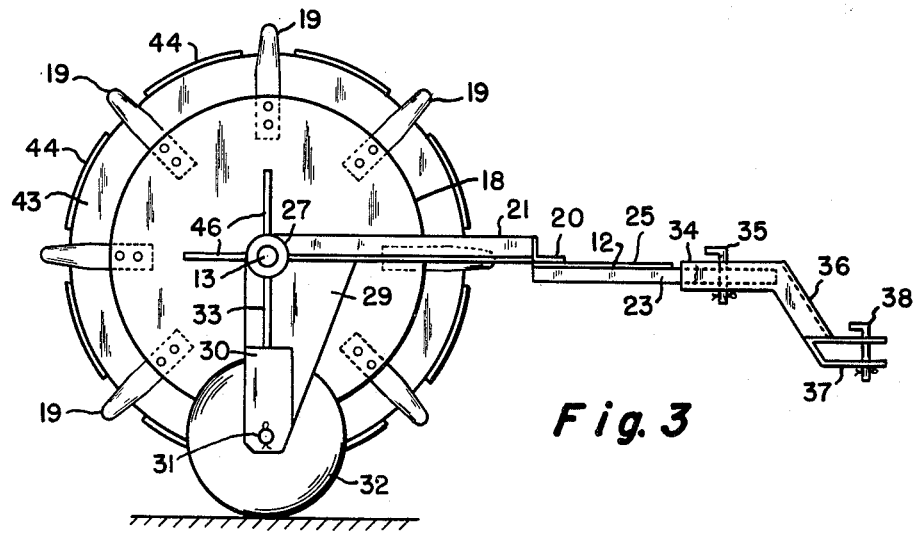
FIGURE 3 is a side elevation view similar to FIGURE 2 with the transport wheels in the down traveling position.

When the transport wheels are swung from position shown in FIGURE 2 to the position shown in FIGURE 3, it is necessary to reverse the tractor hitch for the draw bar. This hitch includes a flat Z-shaped structure including an upper box beam 34 having a hole which admits a clevis pin 35. Box beam 34 slides onto box beam 23 as shown in FIGURE 5. The clevis pin 35 passes through the holes in box beams 34 and 23 to attach the hitch to the draw bar 12. A central downwardly directed box beam 36 is welded to the underside of box beam 34 and a clevis 37 is welded to the lower end of beam 36. Clevis 37 has holes through which a second clevis pin 38 passes to attach the hitch to the tractor. When the transport wheels are swung from the position of FIGURE 2 to the position of FIGURE 3, it is necessary to remove the clevis pin 35, turn the hitch upside-down and reattach the hitch to the draw bar 12 by insertion of the clevis pin 35.

The tanks 14 and 15 are preferably cylindrical hollow drums having removable plugs 39 in openings therein to permit admission of fluid for providing weight to the tank. This fluid can be water, oil, or a similar material. Each tank 14 and 15 has a cylindrical outer surface 40 and integral end walls 41. A central tubular cylinder 42 is affixed to and between the end walls and slidably receives the axle 13, thereby permitting rotation of the tanks 14 and 15 on the shaft 13. The shaft 13 is located along the axis of revolution of the cylindrical tanks. The tank can be other shapes but cylindrical is preferred due to ease of fabrication. A continuous radially extending disk aerator tube holder 43 is attached to the axial midpoint of the outer cylindrical surface 40 of each tank and has a plurality of radially aligned holes for attachment of aerator tubes 19 in the manner to be described hereinafter. A plurality of curved walking shoes 44 are welded to the outer periphery of plate 43 and normally engage the surface of the turf when the aerator is operating along the turf, in the manner shown in FIGURE 4. The shoes 44 are spaced about the periphery of plate 43 to provide spaces for mounting the aerator tubes 19 in the manner shown in FIGURE 2.

Preferably, three disk aerator tube holders 16, 17 and 18 are also mounted for rotation on the axle 13. Each of these disks includes a central cylinder 45 welded to the circular disks 16, 17 and 18 and gusset plates 46 welded between the tube and disk to provide an integral unit. The cylinder 45 slidably receives axle 13 so the disks may rotate about axle 13.

A plurality of radially aligned holes are provided around the periphery of each disk 16, 17 and 18 for mounting the aerator tube 19 with nuts and bolts.

It should be particularly pointed out that each of the drums 14, 15 and each of the disks 16, 17 and 18 are individually rotatable on the axle 13 and separated by washers 63 which provide for simple turning of the aerator device in the smallest radius in which the tractor or the like can turn.

The disks 16, 17 and 18 are of a size such that the outer radial extremity of the tubes 19 mounted thereon is about the same distance from axle 13 as the outer radial extremity of the tubes 19 mounted on plates 43.

The plates 43 are preferably of greater diameter than disks 16, 17 and 18 so that the shoes 44 limit the penetration of all the tubes into the turf.

As shown in FIGURE 2, the tubes 19 are spaced around the peripheries of plates 43 and disks 16, 17 and 18 such that only one tube 19 on each plate or disk is at full penetration in the turf at any time. This avoids tearing the turf during operation of the aerator, particularly during turning. Preferably, the tubes 19 extend about 3" beyond the peripheries of plates 43 and disks 16, 17 and 18 and the diameter of each plate 43 is about 30".

Referring specifically to FIGURES 6, 7 and 8, each aerator tube 19 includes a lower tapered cylindrical portion 47 which is hollow inside and has about a 7° taper to permit the grass plugs which are cut by the tubes to be easily released from the tubes upon rotation of the aerator tubes. The perforating end of the cylindrical portion 47 is angularly disposed as shown in FIGURE 7 and the cutting edge is flat for about 1/8", since a knife edge on the end of the tube would result in cracks up the entire tube. The right-hand portion of the tube 19 of FIGURE 7 is a U-shaped portion 48 having a plurality of aligned holes 49 and 50. As viewed in FIGURE 8, it can be seen that a headed bolt, which is used to fasten the aerator tubes to the disks 16, 17 and 18 and plate 43, is inserted through each hole 49 and 50 and the head is positioned within the flat portion of the tube. Each head of the bolts seats in this flat portion and no wrench is required to hold the head of the bolt while the nuts are being threaded onto the bolt in attaching the tube to the disks and plates. The flat back on the tubes, which engages the plates or disks, prevents rocking of the tubes during use.

In FIGURES 9 and 10, I have shown a modified form of draw bar including a C-shaped tubular frame 51 having draw bar couplings 52 attached to the free ends thereof by nuts and bolts 53. The draw bar couplings 52 have suitable bushings inside for rotatably supporting the axle 13. The nuts and bolts 53 can be easily removed and the draw bar 52 withdrawn from the couplings. The various elements mounted on the shaft 13 can then be threaded off the shaft for transport of the aerator in individual pieces. Each of the individual elements of the aerator is of light weight when the water is removed from the drums, thereby permitting easy handling. The tubular draw bar 51 has a forward plate 54 attached thereto, and a tractor hitch 55 attached to the plate. The tractor hitch includes a downwardly directed C-plate attached to a clevis 56 which admits a clevis pin 57 for attachment to the tractor. The advantages of the draw bar of FIGURES 9 and 10 are lightweight and ease of disassembly of the aerator.

In FIGURE 11, I have shown a modified form of my invention including a C-shaped tubular draw bar 58 having draw bar couplings 52 attached to the free ends thereof in the same manner described above with respect to FIGURES 9 and 10. The structure of FIGURE 11 is particularly adapted for manual operation in aerating a lawn and the axle 59 is of shorter length than axle 13, thereby permitting the mounting of only two drums 14 and 15 and the center disk 16 as shown in FIGURE 11. The tubular draw bar 58 has handles 60 on the outer end for operation by the user in pushing or pulling the aerator across the turf. A hitching device 61 is provided between the handle for attachment of the aerator to a power lawn mower or the like. This device 61 is shown in the withdrawn position in FIGURE 11 but for use, it is reversed in direction by removal of the nuts and bolts 62 and positioned between the two handles 60 and the nuts and bolts replaced.

In the drawings, I have shown a preferred arrangement of mounting the tubes 19 in which the tubes are all mounted on the inside of disks 17 and 18 but are mounted on alternate sides of plates 43 and disk 16. Thus, on plates 43 and disk 16, the first tube is mounted on one side and the next tube on the opposite all around the plate or disk. The tubes on disks 17 and 18 are all mounted inside to prevent the turf plugs from dropping on the couplings 26 and 27 and providing an abrasive in the bearings in the couplings. As the disks and plates rotate, the turf plugs are released from the tubes 19 due to the taper therein and frequently do not release until the tubes are upside-down.

*Operation*

Water is added to the drums 14 and 15 in equal amounts and the aerator is operated over the turf. The tanks should contain only sufficient water to achieve complete penetration of tubes 19 with a minimum weight being carried by shoes 44.

I have found that a desirable size plug to cut from the turf is ½" to ¾", preferably ⅝", in diameter with a turf penetration of about 3".

My invention can also readily be arranged for use in gangs in a well-known manner.

While I have described the present preferred embodiment of my invention, it may be otherwise embodied within the scope of the following claims.

I claim:

1. In apparatus for aerating turf having a frame, the invention comprising an axle mounted upon said frame, at least first and second substantially cylindrical drums rotatably mounted in spaced relationship to each other upon said axle for rotation relative to said frame, each of said drums having only a single row of tubes which extend substantially radially from the periphery thereof, individual depth limiting means mounted on said drums and spaced around and from the periphery thereof, said tubes extending radially beyond said depth limiting means, each drum being rotatable independently of the other drum, a plate-like disk independent of said drums rotatably, mounted directly upon said axle and rotatable relative to said frame and independently of said drums, said disk being located between said first and second drums, a single row of substantially radially extending tubes carried by said disk, said tubes of said drums and said disk being positioned for penetration of said turf and the outermost end of each tube penetrating said turf to form and remove a plug of turf during rotation of said drums and said disk, said tubes in each row on said drums and on said disk being spaced apart a distance such that at any time only one tube in each row is at full penetration in the turf.

2. The invention of claim 1 including additional disks rotatably mounted directly upon said axle at the transverse outside end of each drum, said disks being rotatable independently of said drums and of each other, a single row of substantially radially extending tubes carried by said additional disks, said tubes in each row being spaced apart a distance such that at any one time only one tube in each row completely penetrates the turf.

3. In apparatus for aerating turf having a frame, the invention comprising an axle mounted on said frame, a pair of substantially cylindrical tanks rotatably mounted upon said axle and rotatable about their axis of revolution relative to said frame and independently of each other, a radially extending continuous circular plate affixed to the periphery of each tank, the periphery of said plate engaging said turf during travel of said apparatus therealong, a plurality of turf engaging elements affixed to said plates in a substantially radial direction to penetrate said turf and remove turf plugs, a first disk positioned between said tanks, a second disk positioned at one end of said tanks and a third disk positioned at the other end of said tanks, said disks being mounted upon and rotatable about said axle independently of said tanks and of each other and having a lesser diameter than said circular plates affixed to said tanks, a plurality of turf engaging elements affixed to each disk in a substantially radial direction to penetrate said turf and remove turf plugs during travel of said apparatus therealong.

4. The invention of claim 3 characterized by said tanks being hollow and being adapted to contain a liquid.

References Cited by the Examiner

UNITED STATES PATENTS

| | | | |
|---|---|---|---|
| 87,642 | 3/69 | Culver | 172—554 |
| 913,350 | 2/09 | Baylis | 294—50.7 |
| 1,069,264 | 8/13 | Keller | 172—154 |
| 1,182,941 | 5/16 | Teter | 172—154 |
| 2,194,597 | 3/40 | Johnson | 294—50.7 |
| 2,700,926 | 2/55 | Goit | 172—22 |
| 2,812,701 | 11/57 | Weaver | 172—556 |

FOREIGN PATENTS

| | | |
|---|---|---|
| 107,437 | 5/39 | Australia. |
| 135,871 | 4/80 | France. |
| 447,976 | 7/27 | Germany. |
| 441,434 | 1/36 | Great Britain. |
| 702,383 | 1/54 | Great Britain. |
| 703,171 | 1/54 | Great Britain. |

T. GRAHAM CRAVER, *Primary Examiner.*

ABRAHAM G. STONE, *Examiner.*